US000001279H

United States Statutory Invention Registration [19]

[11] Reg. Number: H1279

Stephenson

[43] Published: Jan. 4, 1994

[54] CATALYSTS FOR CURING SILANE COATING COMPOSITIONS

[76] Inventor: Maurice A. S. Stephenson, 4530 Osage Ave., Apt. B, Philadelphia, Pa. 19143

[21] Appl. No.: 940,792

[22] Filed: Sep. 14, 1992

Related U.S. Application Data

[63] Continuation of Ser. No. 699,346, May 13, 1991, abandoned.

[51] Int. Cl.[5] ..... C08F 10/00

[52] U.S. Cl. ..... 524/317

[58] Field of Search ..... 525/326.5; 526/279; 524/317, 320, 484, 588

[56] References Cited

U.S. PATENT DOCUMENTS

| | | | |
|---|---|---|---|
| 4,043,953 | 8/1977 | Chang et al. | 525/326.5 |
| 4,772,672 | 9/1988 | Isozaki et al. | 526/273 |
| 4,923,945 | 5/1990 | Isozaki et al. | 526/279 |
| 5,051,473 | 9/1991 | Tabuchi et al. | 526/279 |

FOREIGN PATENT DOCUMENTS

| | | |
|---|---|---|
| 0308203 | 3/1989 | European Pat. Off. . |

*Primary Examiner*—Robert L. Stoll
*Assistant Examiner*—Joseph D. Anthony

[57] ABSTRACT

Improved curing catalysts are disclosed for use in a coating composition containing a film-forming organosilane polymer. The catalysts can cure hydrolytically stable compositions, which do not prematurely gell by moisture. The coating composition can be used as a one package clearcoat over a conventional pigmented basecoat, or as a basecoat, monocoat or primer when a suitable amount of pigment is incorporated therein. The coating composition provides improved properties, including increased chemical etch resistance.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATALYSTS FOR CURING SILANE COATING COMPOSITIONS

This is a continuation of application Ser. No. 07/699,346, filed May 13, 1991, now abandoned.

BACKGROUND OF THE INVENTION

This invention is directed to a composition useful for coating a variety of substrates. In particular, this invention is directed to the use of catalysts for curing organosilane compositions, especially compositions which are hydrolytically stable.

It is well known that consumers prefer automobiles and trucks with an exterior finish having an attractive aesthetic appearance, including high gloss and excellent DOI (distinctness of image). While ever more aesthetically attractive finishes have been obtained, deterioration of the finish over time, whereby the exterior finish of an automobile or truck loses its luster or other aspects of its aesthetic appearance, may be all the more noticeable. An increasingly observed cause of this deterioration is etching of the finish caused by exposure to environmental chemical attack. Chemicals that may cause etching of a finish include pollutants such as acid rain and chemical smog.

In order to protect and preserve the aesthetic qualities of the finish on a vehicle, it is generally known to provide a clear (unpigmented) topcoat over a colored (pigmented) basecoat, so that the basecoat remains unaffected even on prolonged exposure to the environment or weathering. It is also generally known that alkoxysilane polymers, due to strong silane bonding when cured, exhibit excellent chemical resistance. Exemplary of prior art patents disclosing silane polymers for coating are U.S. Pat. Nos. 4,368,297; 4,518,726; 4,043,953; and Japanese Kokai 57-12058.

However, to applicants, knowledge, none of the previously disclosed alkoxysilane compositions for finishing automobiles or trucks have ever as yet been placed into commercial use. It is believed that heretofore known or patented alkoxysilane coatings have suffered from various unsolved problems or deficiencies. One problem with the use of such silane compositions is that if the composition becomes contaminated with water or moisture before it is applied, there is a danger the composition may prematurely gell, thereby becoming useless.

The premature gelling of a siloxane or silane polymer is related to its curing or crosslinking reactivity. There is a reactivity difference between various silane polymers. Two steps are believed involved in the cure mechanism. The first is the hydrolysis of the alkoxy silane groups in the silane polymer to give a more reactive silanol. Subsequent condensation ensues to give the siloxane crosslink. The complete mechanism as to how these two reactions occur is not fully understood. Typically, as one moves from methoxy to ethoxy to propoxy to butoxy silanes, the rate of hydrolytic cleavage decreases, due primarily to the increase in steric bulk around the silicon atom. For the latter reason, ethoxy silane and higher alkoxy silanes, as compared to methoxy silanes, have been referred to as "hydrolytically stable silanes." Although offering hydrolytic stability, such polymers are, however, more difficult to cure. Conventional curing catalysts for methoxy silanes are generally not sufficiently effective for hydrolytically stable alkoxy silanes.

Various catalysts have been identified for curing of silane polymers. Typically, water and heat have been used. A variety of mineral acids have found broad application, including $H_2SO_4$, $H_3BO_3$, $H_3PO_3$ and the like. These catalysts are believed to promote catalysis by protonation of the alkoxy group with subsequent displacement of the ensuing alcohol by the nucleophile, water, giving the silanol. Other catalysts which have found widespread use include various Lewis acids. These are electron-deficient species which are able to coordinate to the oxygen of the alkoxy group attached to the silicon and thereby promote its displacement. The most widely used such catalyst is dibutyl tin dilaurate. Other conventional catalysts include amines, sulfonic acids, and blends of catalysts. Various conventional catalysts are disclosed in European Patent No. 0308203.

As indicated above, conventional curing catalysts, although effective for curing methoxy silanes, are generally ineffective for curing hydrolytically stable silanes. There is a need for catalysts which can enhance the curing of ethoxy silane and other hydrolytically stable silane compositions. If such catalysts were found, they might be useful for making a coating composition having an extended shelf life, which composition is not be susceptible to premature gelling. By means of such catalysts, it might be possible to obtain a one package silane composition.

SUMMARY OF THE INVENTION

The invention is directed to a coating composition useful for finishing the exterior of automobiles and trucks and other substrates. The composition comprises:

(a) from about 20 to 90% by weight, based on the weight of the binder, of a film-forming alkoxysilane functional polymer, having a weight average molecular weight of about 1000–30,000; and (b) from about 0.1 to 10% by weight, based on the weight of the composition, of a catalyst which is a metal chelate of a trialkanolamine, wherein said alkanol has 1 to 4 carbon atoms, and said metal is selected from the group consisting of tin, aluminum, titanium, and zirconium; and (c) from about 25 to 50% by weight, based on the weight of the composition, of a liquid organic carrier.

The invention also includes a process for coating a substrate with the above coating composition. Finally, the invention includes a substrate having adhered thereto a coating according to the above composition.

The catalysts employed in the present composition of the present invention generally exhibit faster rates of curing with respect to silanes. However, these catalysts are especially useful in combination with hydrolytically stable organosilane polymers, and they may be used to provide a one package system. In such a coating composition, water or moisture is not needed for curing. Furthermore, water or moisture will not cause premature gelling of the composition. The present composition is also especially useful for providing a clear topcoat (clearcoat) over a pigmented basecoat (colorcoat). Such a clear topcoat can be applied over a variety of basecoats, such as powder basecoats or basecoats containing water or organic solvents.

DETAILED DESCRIPTION OF THE INVENTION

The present coating composition employs a silane-containing film-forming polymer as a key component for providing a coating having the desired physical and chemical properties of the coating. It is desired that such a coating is durable, has excellent adhesion to basecoats, does not crack, does not deteriorate in terms of transparency under prolonged exposure to weather conditions, and imparts a superior glossy appearance for an extended period of time. Also, it is desirable that such a coating is resistant to etching caused by environmental chemical attack.

As indicated above, silane coating compositions are generally known. The improvement of the present composition is characterized by the presence, in the silane composition, of an advantageous catalyst for effectively curing silane compositions, especially compositions which are hydrolyticaly stable before application as a coating. With hydrolytically unstable organosilane compositions, the same catalysts have been found to provide effective and rapid curing.

The catalysts employed in the present composition effect crosslinking of pendant silane groups in the organosilane polymers. These catalysts, in contrast to conventional catalysts, can effectively cure hydrolytically stable organosilanes and are capable of working well without the use of water or alcohol as a co-reactant. Such coating systems have good stability even in the presence of moisture. This allows for one package systems, since the curing catalyst need not be separated from the organosilane binder during storage. Furthermore, this permits the composition to be stored without special precautions to exclude moisture.

Another advantage of the present composition is that coatings produced therewith have excellent appearance, compared to other siloxane coatings, with significantly less stress build-up after curing. Furthermore, such coatings are generally improved in terms of humidity resistance.

The present composition is particularly useful for coating originally manufactured automobiles or parts thereof, which are typically baked at elevated temperatures above 200° F. A typical automobile steel panel or substrate has several layers of coatings. The substrate is typically first coated with an inorganic rust-proofing zinc or iron phosphate layer, over which is provided a primer which can be an electrocoated primer or a repair primer. A typical electrocoated primer typically comprises a cathodically deposited epoxy modified resin. A typical repair primer comprises an alkyd resin. Optionally, a primer surfacer can be applied over the primer to provide for better appearance and/or improved adhesion of the basecoat to the primer. A pigmented basecoat or colorcoat is next applied over the primer. A typical basecoat comprises a pigment, which may include metallic flakes in the case of a metallic finish, and a polyester or acrylourethane as a film-forming binder. A clear topcoat (clearcoat) is then applied to the pigmented basecoat (colorcoat). The colorcoat and clearcoat are preferably deposited to have thicknesses of about 0.1–2.5 mils and 1.0–3.0 mils, respectively. A composition according to the present invention, depending on the presence of pigments or other conventional components, may be used as a basecoat, clearcoat, or primer. However, a particularly preferred composition is useful as a clear topcoat to prevent environmental chemical attack to the entire finish. A clearcoat composition of the present invention may be applied over a basecoat composition of the present invention.

The film-forming portion of the present coating composition, comprising polymeric components, is referred to as the "binder" or "binder solids" and is dissolved, emulsified or otherwise dispersed in an organic solvent or liquid carrier. The binder solids generally include all normally solid polymeric non-liquid components of the composition. Generally, catalysts, pigments, or chemical additives such as stabilizers are not considered part of the binder solids. Non-binder solids, other than pigments, do not usually amount to more than about 10% by weight of the total composition. In this disclosure, the term binder includes organosilane polymers, dispersed polymers, and all other optional film-forming polymers.

The applied coating composition suitably contains about 50–75% by weight of binder, about 25–50% by weight of an organic solvent carrier. The coating composition suitably contains about 30–90%, preferably 40–80% by weight, based on the weight of binder, of a film-forming silane polymer, also referred to as the silane or siloxane polymer. About 0.1–10% by weight of catalyst, to be described below, is used to cure the silane polymer. Preferably, these catalysts are used in the amount of about 0.1 to 5.0% by weight of the composition, typically 0.5 to 1% of such catalysts sufficing.

The type of catalyst employed in the composition of the present invention is a trialkanolamine metal catalyst having the following structure:

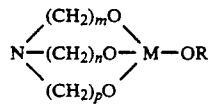

wherein said alkanol has 1 to 4 carbons, that is m, n and p are independently 1 to 4; R is an unsubstituted or substituted alkyl or alkanol having 1 to 6 carbon atoms, preferably 2 to 4; and M is a metal selected from the group consisting of tin, aluminum, titanium, or zirconium. The specific R group is not critical and may be branched or unbranched or unsubstituted or substituted with, for example, an acid or ketone group, a halogen such as fluorine, or a haloalkyl such as trifluoromethyl. A preferred catalyst is a triethanolamine chelate of titanium (commercially available from E.I. duPont de Nemours & Co. as TYZOR TE organic titanate).

Such catalysts, as mentioned above, are used to crosslink the pendant silane groups in the silane polymer of the present composition. The silane polymer has a weight average molecular weight of about 1000–30,000, and a number average molecular weight of about 500–10,000. All molecular weights disclosed herein are determined by gel permeation chromatography using a polystyrene standard.

The silane polymer is characterized by the presence of alkoxysilane —$Si(OR)_3$ groups, in which each of the three alkoxy groups independently contain 1 to 6 carbon atoms, preferably 2–4 carbon atoms. Such silane-containing polymers include silane functional acrylic polymers, acrylic urethane polymers, polyesters, polyester urethanes, and copolymers thereof. Silane polymers may be grouped into three different categories: (1) polymers which are the reaction product of a mixture of monomers, a portion of which contain an alkoxysilane group, and (2) silane-modified polymers in which alkoxysilane-containing compounds, oligomers, or macromonomers are attached to an already formed polymer, for example, by means of reaction of a silane isocyanate with a hydroxy functional polyester, and (3) combinations of (1) and (2), for example graft polymers.

Silane-modified polyesters which may be employed in this invention are suitably prepared from linear or branched chain diols, including ether glycols, or mixtures thereof or mixtures of diols and triols, containing up to and including 8 carbon atoms, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid. A commercially available conventional polyester, which may be employed in the present composition, is Rucoflex 1015S-120 polyester, having a hydroxy number of 125 and composed of one mole of a glycol, 2 moles of adipic acid, and 2 moles of neopentyl glycol.

Preferred silane-modified polyester copolymers include polyester urethanes, which suitably are a reaction product of a hydroxyl terminated polyester and a polyisocyanate, preferably, an aliphatic or cycloaliphatic diisocyanate.

In the present composition, the polyesters or polyester urethanes, before being silane-modified, have a hydroxyl number of about 10–200 and preferably 40–160 and have a weight average molecular weight of about 6,000–30,000, preferably 9,000–17,000, and a number average molecular weight of about 2,000–5,000, preferably 3,000–4,000. All molecular weights mentioned herein are measured using gel permeation chromatography using polyethyl methacrylate as a standard.

Representative saturated and unsaturated polyols that can be reacted to form a polyester include alkylene glycols such as neopentyl glycol, ethylene glycol, propylene glycol, butane diol, diol, 1,6-hexane diol, 2,2-dimethyl-1,3-dioxolane-4-methanol, 4-cyclohexane dimethanol, 2,2-dimethyl 1,3-propanediol, 2,2-bis(hydroxymethyl)propionic acid, and 3-mercapto-1,2-propane diol. Neopentyl glycol is preferred to form a flexible polyurethane that is soluble in conventional solvents Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

Representative carboxylic acids that can be reacted to form a polyester include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid and the like. Prefered dicarboxylic acids are a combination of dodecandioic acid and azelaic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form a polyester urethane are many and are listed in copending commonly assigned application Ser. No. 07/699,344 hereby incorporated by reference. Aliphatic diisocyanates are preferred, forming urethanes that have excellent weatherability. One aliphatic diisocyanate that is particularly preferred is a mixture of 2,2,4-trimethyl hexamethylene diisocyanate and 2,4,4-trimethyl hexamethylene diisocyanate. One cycloaliphatic diisocyanate that is particularly preferred is 4,4-methylene-bis(-cyclohexylisocyanate).

A preferred polyester urethane is the reaction product of trimethylhexamethylene diisocyanate and a hydroxy terminated polyester of neopentyl glycol, trimethylol propane, azelaic acid and dodecanedioic acid.

Another suitable polyester urethane is the reaction product of 4,4-methylene-bis(cyclohexyl isocyanate) and a hydroxy terminated polyester of 1,6 hexane diol, cyclohexane diethanol, trimethylol propane and azelaic acid.

Conventional techniques may be used to prepare the polyester and polyester urethanes employed in the present composition. To form a polyester, the component polyols and carboxylic acids and solvent are esterified at about 110°–250° C. for about 1–10 hours. To form a polyester urethane, a polyisocyanate may then be added and reacted at about 100°–200° C. for about 15 minutes to 2 hours.

In preparing the polyester, an esterification catalyst is typically used. Conventional catalysts include benzyl trimethyl ammonium bydroxide, tetramethyl ammonium chloride, organic tin compounds, such as dibutyl tin diaurate, dibutyl tin oxide, stannous octoate, titanium complexes and litharge. About 0.1–4% by weight, based on the total weight of the polyester, of the catalyst is typically used. The aforementioned catalysts may also be used to form the polyester urethane.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,759, hereby incorporated by reference.

A preferred polyester urethane for use in preparing silane-modified polyesters comprises 32.4% neopentyl glycol, 4.0% trimethylol propane, 21.5% azelaic acid, 26.3% dodecanedioic acid, and 15.8% 1,3,5-trimethylhexamethylene diisocyante. A suitable polyester may comprise 22.0% neopentyl glycol, 14.4% trimethylol propane, 6.7% 1,6-hexanediol, 11.8% iso-phthalic acid, 8.0% phthalic acid, 14.3% adipic acid, and 22.5% dodecanedioic acid. Such a polyester having a hydroxyl number of 140 may then be reacted with a silane-isocyanate to produce a silane-modified polyester. Another polyester, commercially available from Ruco Chemical Company, is Rucolflex S1015-120 polyester, having a hydroxyl number of 125. It is believed to be made from 1 mole of a glycol, possibly 1,6-hexanediol, 2 moles of adipic acid, and 2 moles of neopentyl glycol. This polyester may be reacted with a silane-isocyanate to produce a silane-modified polyester. Another suitable polyester may be made by reacting 1 mole of tris (hydroxyethyl) isocyanurate with 6 moles of caprolactone to give a polyester having 3 hydroxyl groups. This polyester is then reacted with silane-isocyanate to give the silane-modified polyester.

Another class of silane polymers usable in the present composition is the polymerization product of about 30–95%, preferably 40–60%, by weight ethylenically unsaturated non-silane-containing monomers and about 5–70%, preferably 40–60%, by weight ethylenically unsaturated silane-containing monomers, based on the weight of the organosilane polymer. Suitable ethylenically unsaturated non-silane containing monomers are alkyl acrylates, alkyl methacrylates and any mixtures thereof, where the alkyl groups have 1–12 carbon atoms, preferably 1 to 4 carbon atoms.

Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane containing polymerizable monomers, up to about 50% by weight of the polymer, can be used in the acrylosilane polymer for the purpose of achieving the desired properties such as hardness, appearance, mar resistance and the like. Exemplary of such other monomers are styrene, methyl styrene, acrylamide, acrylonitrile, methacrylonitrile, and the like. Styrene can be used in the range of 0–50% by weight.

A suitable silane containing monomer useful in forming the acrylosilane polymer is an alkoxysilane having the following structural formula:

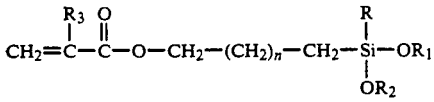

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gamma-methacryloxypropyltriethoxy silane, and gamma-methacryloxypropyltris(2-methoxyethoxy) silane.

Other suitable alkoxy silane monomers have the following structural formula:

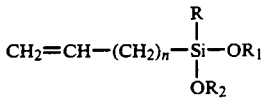

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are ethylenically unsaturated acyloxysilanes, including acrylatoxy silane, methacrylatoxy silane and vinylacetoxy silanes, such as vinylmethyldiacetoxy silane, acrylatopropyltriacetoxy silane, and methacrylatopropyltriacetoxy silane. Of course, mixtures of the above-mentioned silane-containing monomers are also suitable.

As indicated above, the silane containing monomers typically contain methoxy, ethoxy, or propoxy alkoxy groups attached to the silicon atom. These alkoxy groups have varying degrees of reactivity. The pendant silane moiety containing alkoxy functionality has been classified as either hydrolytically unstable ($OCH_3$) or hydrolytically stable ($OCH_2CH_3$, $OCH_2CH_2CH_3$, etc., for example having 2 to 6 carbon atoms). These bulkier alkoxy groups possess greater thermal and pot stability.

Consistent with the above, an example of an organosilane polymer useful in the coating composition of this invention may contain the following constituents: about 15–25% by weight styrene, about 30–60% by weight methacryloxypropyltrimethoxy silane, and about 25–50% by weight trimethylcyclohexyl methacrylate. One preferred acrylosilane polymer contains about 30% by weight styrene, about 50% by weight methacryloxypropyl trimethoxy silane, and about 20% by weight of nonfunctional acrylates or methacrylates such as trimethylcyclohexyl methacrylate, butyl acrylate, or isobutyl methacrylate and mixtures thereof.

Silane functional macromonomers also can be used in forming the silane polymer. These macromonomers are the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

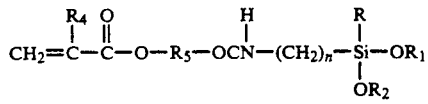

wherein R, $R_1$, and $R_2$ are as described above; $R_4$ is H or $CH_3$, $R_5$ is an alkylene group having 1–8 carbon atoms and n is a positive integer from 1–8.

In addition to the organosilane polymer, other film-forming and/or crosslinking solution polymers may be included in the present application. Examples include conventionally known acrylics, cellulosics, aminoplasts, urethanes, polyesters, epoxides or mixtures thereof.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat.

No. 4,591,533, the entire disclosure of which is incorporated herein by reference.

The composition may also include other conventional formulation additives such as flow control agents, for example, such as Resiflow ® S (polybutylacrylate), BYK 320 and 325 (high molecular weight polyacrylates); rheology control agents, such as fumed silica; water scavengers such as tetrasilicate, trimethyl orthoformate, triethyl orthoformate and the like.

When the present composition is used as a clearcoat (topcoat) over a pigmented colorcoat (basecoat) to provide a colorcoat/clearcoat finish, small amounts of pigment can be added to the clear coat to eliminate undesirable color in the finish such as yellowing.

The present composition also can be pigmented and used as the colorcoat, or as a monocoat or even as a primer or primer surfacer. The composition has excellent adhesion to a variety of substrates, such as previously painted substrates, cold rolled steel, phosphatized steel, and steel coated with conventional primers by electrodeposition. The present composition exhibits excellent adhesion to primers, for example, those that comprise crosslinked epoxy polyester and various epoxy resins, as well as alkyd resin repair primers. The present compositon can be used to coat plastic substrates such as polyester reinforced fiberglass, reaction injection-molded urethanes and partially crystalline polyamides.

When the present coating composition is used as a basecoat, typical pigments that can be added to the composition inculde the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatable polymer or dispersant by conventional techniques, such as high speed mixing, sand grinding, ball milling, attritor grinding or two roll milling. The mill base is then blended with the other constituents used in the coating composition.

Conventional solvents and diluents are used to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

The coating composition can be applied by conventional techniques such as spraying, electrostatic spraying, dipping, brushing, flowcoating and the like. The preferred techniques are spraying and electrostatic spraying. After application, the composition is typically baked at 100°-150° C. for about 15-30 minutes to form a coating about 0.1-3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet on wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated.

EXAMPLE 1

This example illustrates a polyester urethane that may be silane-modified and employed in the present invention. A polyester urethane solution may be prepared by charging the following constituents into a reaction vessel equipped with a stirrer, a heating source and a reflux condenser:

| | Parts by Weight |
|---|---|
| Portion 1 | |
| Water | 212.30 |
| Neopentyl glycol | 1910.60 |
| Portion 2 | |
| Trimethylol propane | 259.53 |
| Azelaic acid | 1454.24 |
| Dodecanedioic acid | 1779.12 |
| Portion 3 | |
| Toluene | 113.60 |
| Portion 4 | |
| Toluene | 190.55 |
| Aromatic hydrocarbon solvent | 886.00 |
| Portion 5 | |
| Neopentyl glycol | 394.03 |
| Stannous octoate | 0.85 |
| Portion 6 | |
| 2,3,5-trimethylhexamethylene diisocyanate | 1069.52 |
| Portion 7 | |
| Aromatic hydrocarbon solvent | 945.70 |
| Total | 9216.04 |

Portion 1 was charged into the reation vessel, the reaction vessel was purged with nitrogen, and the constituents of Portion 1 were heated to about 65°-70° C. The constituents of Portion 2 were charged into the vessel in the order shown, while the constituents in the vessel were maintained at the above temperature. The constituents then were heated to 120° C., and the resulting composition was refluxed to remove water as a polyester was formed. The temperature was gradually increased as water was removed until it reached about 240° C. Heating was continued until an acid number of the polyester was about 0-1.5. Portion 3 then was added. Heating was stopped and Portion 4 was added to cool the resulting compostion to about 120° C. Portion 5 was then added and the moisture content of the composition was determined by a Fisher method. If the moisture content was over 0.1%, the composition would be dried azeotropically for 30 minutes and the moisture content determined again. Portion 6 was added to the composition at a uniform rate over a 30 minute period without external heating. The composition was held at about 120°-145° C. for 30 minutes and a sample removed and tested for unreacted isocyanate by infrared analysis. If there was unreacted isocyanate in the composition, the composition would be held for a additional 30 minutes at the above temperature.

Portion 7 then was added and the resulting composition was allowed to cool to ambient temperatures.

The resulting composition had a polymer weight solids content of about 76%. The polyester urethane contained about 32% neopentyl glycol, 4% trimethylol propane, 22% azelaic acid, 26% dodecanedioic acid and 16% trimethylhexamethylene diisocyanate and had a Mw (weight average molecular weight) of 15,000 determined by GPC and had a hydroxyl number of about 80.

For curing the composition, a catalyst comprising a blocked aromatic sulfonic acid solution was prepared as follows:

| | Parts by Weight |
|---|---|
| Portion 1 | |
| Methanol | 267.26 |
| Aromatic sulfonic acid solution (70% solids of dodecyl benzene sulfonic acid in isopropanol) | 296.99 |
| Methanol | 36.35 |
| Portion 2 | |
| Oxazoline solution (76% 4,4-dimethyl-1-oxa-3-azacyclopentane, 2% 3,44-trimethyl-1-oxa-azocyclopentane in 22% water) | 91.05 |
| Portion 3 | |
| Methanol | 36.35 |
| Total | 728.00 |

Portion 1 was charged into a reaction vessel and then portion 2 was added and allowed to react and then portion 3 was added and the solution was cooled to an ambient temperature. The resulting polyester urethane having a hydroxy number of 80 was then reacted with silane isocyanate to produce a silane-modified polyester urethane.

EXAMPLE 2

This example illustrates in greater detail the modification of a polyester to obtain a silane-modified polyester. The polyester in this example consisted of 22.0% neopentyl glycol, 14.4% trimethylolpropane, 6.7% 1,-hexanediol, 11.8% iso-phthalic acid, 14.3% adipic acid, and 22.5% dodecanedioic acid. To a dried 5000 mol four neck round-bottom flask equipped with a nitrogen inlet, a condensor, mechanical stirrer and a dropping funnel is added 500 g (0.998 equivalents) of a difunctioal hydroxy polymer and 30 g of dried methyl ethyl ketone. The temperature is raised to 110° C. and refluxing solvent is collected and checked to see if it was cloudy. The evidence of no cloudiness is indicative of the absence of water in the polymer. The reaction temperature is lowered to 80° C. and 217.0 g (1.048 equivalents) of the isocyanatopropyl silane (methoxy) is added along with 200 g of a 50/50 blend of two organic solvents and 5 grams of n-methyl-pyrrolidine, a viscosity reducing solvent, and 2 drops (0.0414 g or $1.07\times10^{-4}$ equivalents) of tin catalyst. The reaction temperature is maintained between between 80°–90° C. and the disappearance of the isocyanate is progressively monitored by infrared spectroscopy. The complete disappearance of this peak is indicative that the reaction is over. Typically, this takes 4 to 8 hours to occur. The reaction is then quenched with methanol,(20 g), poured into a container and the solids content determined. Typically these polymers are made at 70–80% solids with a viscosity of M or N (Gardner-Holtz). The polymer is then stored under nitrogen before being used.

EXAMPLE 3

An organosilane polymer solution A is prepared by charging the following constituents into a polymerization reactor equipped with a heat source and a reflux condensor:

| | Parts by Weight |
|---|---|
| Portion I | |
| "Solvesso" 100 | 75.00 |
| Portion II | |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III | |
| 2,2-(2-methyl butane nitrile) | 57.32 |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 4

An acrylosilane polymer solution B is prepared by first forming a silane containing macromonomer and then reacting the macromonomer with acrylic monomers. The macromonomer is prepared by charging the following constituents into a reactor equipped as above:

| | Parts by Weight |
|---|---|
| Portion I | |
| Y-9030 (isocyanatopropylmethoxy silane) | 750.0 |
| Xylene | 300.0 |
| Portion II | |
| Hydroxyethyl acrylate monomer | 340.0 |
| Total | 1390.0 |

Portion I is heated to about 120° C. and Portion II is slowly added over a 1 hour period with constant mixing. The reaction mixture is held at the above temperature for about 1 hour and the isocyanate level is checked by infrared analysis. When the isocyanate level reaches zero, the reaction is stopped and the resulting macromonomer solution is cooled to room temperature.

Acrylosilane polymer solution B is prepared by charging the following constituents into a reactor as equipped above:

| | Parts by Weight |
|---|---|
| Portion I | |
| "Solvesso" 100 | 430.0 |
| Portion II | |
| Macromonomer solution (prepared above) | 1826.0 |
| Styrene monomer | 765.0 |
| Methyl methacrylate monomer | 153.0 |
| Butyl methacrylate monomer | 153.0 |
| 2-Ethylhexyl methacrylate monomer | 153.0 |
| "Solvesso" 100 | 170.0 |
| Portion III | |
| 2,2-(2 methyl butane nitrile) | 100.0 |
| Solvesso" 100 | 300.0 |
| Total | 4050.0 |

Portion I is charged into the reactor and heated to its reflux temperature. Portions II and III are premixed and slowly added to the reactor while maintaining the reaction mixture at its reflux temperature. Portion II is a added over a 6 hour period and Portion III is added over a 7 hour period. The reaction mixture is held at its reflux temperature for an additional hour and then cooled to room temperature.

The resulting acrylosilane polymer solution has a polymer solids content of about 66%. The polymer has a weight average molecular weight of about 6,000, and has the following constituents: 53% macromonomer, 29% styrene, 6% methyl methacrylate, 6% butyl methacrylate, and 6% 2-ethylhexyl methacrylate.

EXAMPLE 5

An acrylosilane polymer solution C is prepared by cobalt special chain transfer (SCT) by charging the following constituents into a heated reactor flask of five liter volume fitted with a water cooled condensor, stirrer, 2 feed metering pumps and a thermometer:

| | Parts by Weight |
|---|---|
| Portion I | |
| "Solvesso" 100 | 120.00 |
| Ethylene Glycol Monobutyl Ether Acetate | 120.00 |
| Xylene | 150.00 |
| Portion II | |
| gamma-methacryloxypropyltrimethoxy silane | 39.67 |
| Styrene | 28.33 |
| Isobutyl methacrylate | 45.33 |
| $Co(DMG\text{-}BF_2)_2$ | 0.05 |
| VAZO 67 | 2.74 |
| Portion III | |
| gamma-methacryloxypropyltrimethoxy silane | 847.83 |
| Styrene | 605.42 |
| Isobutyl methacrylate | 968.67 |
| Portion IV | |
| VAZO 67 | 17.25 |
| "Solvesso" | 100.00 |
| Ethylene glycol monobutyl ether acetate | 100.00 |
| Xylene | 100.00 |
| Portion V | |
| t-Butyl Peroxyacetate | 10.00 |
| Xylene | 60.00 |

Portion I, containing organic solvents, is charged into the reactor flask and heated under a nitrogen atmosphere to its reflux temperature. Portion II, containing the acrylosilane monomers and an initiator (a cobalt chelate of dimethylglycol and boron difluoride), is added to the refluxing solvent over a 10 minute period. After the 10 minute period, Portion III, containing additional monomers, and Portion IV, containing additional solvent, are each premixed and then added simultaneously to the reactor while the reaction mixture is held at its reflux temperature. Portion III is added at a uniform rate over a period of 360 minutes and Portion IV is added at a uniform rate over a period of 390 minutes. Then, Portion V, containing an initiator to kill the cobalt chain transfer, is fed over a 20 minute period. After Portion V is added, the reaction mixture is held at its reflux temperature for an additional 30 minutes. The resulting acrylosilane polymer solution is cooled at room temperature and filtered. The polymer has a weight average molecular weight of about 10,000–12,000 and constitutes 29% styrene, 30% isobutyl methacrylate and 41% methacryloxypropyltrimethoxy silane.

EXAMPLE 6

An acrylosilane polymer solution D is prepared by a group transfer process (GTP) as follows. To a four neck 3 liter flask, fitted with a stirrer, condenser, two feed pumps, thermometer and nitrogen inlet is added 950 g toluene, 136 g methyl methacrylate, 106 g butyl methacrylate, 118 g trimethoxysilylpropyl methacrylate and 46.2 g trimethoxysilylpropyl dimethyl ketene. The reaction mixture is cooled to 5° C. and 4 ml of tetrabutyl ammonium m-chlorobenzoate catalyst is added over 90 minutes. The catalyst feed is temporarily interrupted during the reaction exotherm. When the exotherm subsides, the catalyst feed is resumed together with a monomer feed, over 40 minutes, of 220 g methyl methacrylate, 212 g butyl methacrylate and 237 g trimethoxysilylpropyl methacrylate . After completing all the addition, the reaction mixture is held for an additional half hour, after which 45 g methanol, for killing the ketene initiator, is added to the reaction mixture. The resulting polymer solution constitutes 35% methyl methacrylate, 31% butyl methacrylate, and 34% methacryloxypropyl trimethoxy silane.

EXAMPLE 7

The following components are used in preparing an acrylosilane solution polymer E by free radical polymerization.

| | Parts by Weight |
|---|---|
| Portion I | |
| "Solvesso" 100 | 726.4 |
| Portion II | |
| Methacryloxypropyltrimethoxy silane | 1380.3 |
| Styrene | 500. |
| Methyl methacrylate monomer | 424.7 |
| 2-Ethylhexyl acrylate | 159.2 |
| Butyl methacrylate monomer | 159.2 |
| Hydrocarbon ("Napoleum" 145A) | 81.8 |
| Portion III | |
| "Lepensol " 70 | 70. |
| Hydrocarbon ("Napoleum" 145A) | 199.3 |
| Portion IV | |
| Hydrocarbon ("Napoleum" 145A) | 27.2 |
| Portion V | |
| Hydrocarbon ("Napoleum" 145A) | 9.1 |

Portion I, containing organic solvent, is charged to the reaction flask and heated to reflux. Portion II, containing the monomers for the acrylosilane polymer, and Portion III are added simultaneously. Portion II is added over a 6 hour period, and Portion III is added over a 7 hour period. After Portion II is added, Portion IV is added immediately. After Portion III is added, Portion V is added immediately. Heating is continued at reflux for one additional hour after all the portions have been added. The reaction mixture is then cooled and filtered.

EXAMPLE 8

This example illustrates a clearcoat composition according to the present invention. The following ingredients were added with mixing and a nitrogen blanket. In each case, the liquid solvent was an 80/20 blend of ethylene glycol monobutyl ether acetate/butylacetate.

| | |
|---|---|
| Clearcoat Composition 1: | |
| Silane-modified polyester urethane (as prepared in Example 1) | 88% |
| Silane-modified Rucoflex S1015-120 polyester | 10% |
| Tyzor-TE catalyst | 0.4% |
| ZW-8027 flow agent | 1.03% |
| Tinuvin 1130 light stabilizer | 0.33% |
| DS-1890 leveling agent | 0.25% |
| Clearcoat Composition 2: | |
| Silane-modified polyester A | 68% |
| Silane-modified Rucoflex S-1015-120 polyester | 30% |
| Tyzor-TE catalyst | 0.4% |
| ZW-8027 flow agent | 1.03% |
| Tinuvin 1130 light stabilizer | 0.33% |
| DS-1890 leveling agent | 0.25% |
| Clearcoat Composition 3: | |
| Silane-modified polyester A | 50% |
| Silane-modified Rucoflex S1015-120 polyester | 33% |
| Silane-modified polyester B | 15% |
| Tyzor-TE catalyst | 0.4% |
| ZW-8027 flow agent | 1.03% |
| Tinuvin 1130 light stabilizer | 0.33% |
| DS-1890 leveling agent | 0.25% |

In the above list, polyester A is 22.0% neopentyl glycol, 14.4% trimethylolpropane, 6.7% 1,6-hexanediol, 11.8% iso-phthalic acid, 8.0% phthalic acid, 14.3% adipic acid and 22.5% dodecanedioic acid. Polyester B is the reaction product of 1 mole of tris(hydroxyethyl) isocyanurate with 6 moles of caprolactone, which is then reacted with silane-isocyanate. The Rucoflex polyester is available from Ruco Chemical Co. Tinuvin 1130 is a U.V. screener available from Ciby-Geigy, "ZW-8027" is tetramethylortho formate (available from Kay-Fries, Inc. (Alabama), DS-1890 is a silicone oil available from Shinetsu (Japan), and Tyzor-TE is a trialkanolamine chelate of titanium, commercially available from Du Pont. The clearcoat is sprayed at a viscosity of 35" Fisher #2 cup. It is sprayed on steel panels at 1.8–2.0 mil thickness and baked 30 min. at 250° F. The composition in each case typically exhibited an out of oven hardness of 3–4 Knoop, a gloss of 85–95 at 20° and a DOI of 80–90. The clearcoat had excellent durability. In the case of ethoxy silane functionality, good pot life was obtained.

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

What is claimed is:

1. A composition useful for coating a substrate, which composition comprises:

(a) from about 20 to 90% by weight, based on the weight of the binder, of a film-forming organosilane polymer, having a weight average molecular weight of about 1000–30,000; and (b) from about 0.1 to 10% by weight, based on the weight of the composition, of an effective amount of a curing catalyst which is a titanium chelate comprising a trialkanolamine, wherein said alkanol has 1 to 4 carbon atoms; and (c) from about 25 to 50% by weight, based on the weight of the composition, of a liquid organic carrier.

2. The composition of claim 1, wherein said catalyst, employed to catalyze the crosslinking of the silane moieties in said organsilane polymer, is a chelate of titanium.

3. The composition of claim 1, wherein the organosilane polymer comprises one or more ethylinically unsaturated non-silane-containing monomers selected from the group consisting of styrene, alkyl acrylate, alkyl methacrylate, cycloaliphatic acrylate, cycloaliphatic methacrylate, aryl acrylates, aryl methacrylate and any mixtures thereof; and one or more ethylenically unsaturated silane-containing monomers selected from the group consisting of alkoxy silane, acyloxy silane, and any mixtures thereof, wherein said alkyl has 1–12 carbon atoms, said cycloaliphatic has 5 to 8 carbon atoms, and said aryl has 6 to 12 carbon atoms.

4. The coating composition of claim 1, wherein the composition comprises about 0.1 to 5.0% by weight, based on the weight of the composition, of said catalyst.

5. The coating composition of claim 1, wherein the organosilane polymer is hydrolytically stable.

6. The coating composition of claim 5, wherein silane functionalities in said organosilane polymer comprise alkoxy groups attached to a silicon atom, wherein the alkoxy groups have at least 2 carbon atoms.

7. A composition useful for coating a substrate, which composition comprises an organosilane polymer and a curing catalyst which catalyst is a trialkanolamine metal catalyst having the following structure:

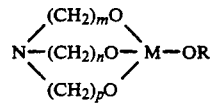

wherein m, n or p are independently 1 to 4; R is an unsubstituted or substituted alkyl or alkanol having 1 to 6 carbon atoms; and M is titanium.

* * * * *